United States Patent [19]
Jackson

[11] Patent Number: 4,689,682
[45] Date of Patent: Aug. 25, 1987

[54] METHOD AND APPARATUS FOR CARRYING OUT TELEVISION SPECIAL EFFECTS

[75] Inventor: Richard A. Jackson, Nevada City, Calif.

[73] Assignee: The Grass Valley Group, Inc., Grass Valley, Calif.

[21] Appl. No.: 922,589

[22] Filed: Oct. 24, 1986

[51] Int. Cl.$^4$ .................... H04N 5/272; H04N 5/262
[52] U.S. Cl. ........................................ 358/183; 358/22
[58] Field of Search ................. 358/183, 180, 182, 22

[56] References Cited

U.S. PATENT DOCUMENTS

| | | | |
|---|---|---|---|
| 3,944,731 | 3/1976 | Busch | 358/183 |
| 4,178,613 | 12/1979 | Takahashi et al. | 358/183 |
| 4,334,245 | 6/1982 | Michael | 358/180 X |
| 4,432,009 | 2/1984 | Reitmeier et al. | 358/22 |
| 4,463,372 | 7/1984 | Bennett et al. | 358/22 |
| 4,468,688 | 8/1984 | Gabriel et al. | 358/22 |
| 4,472,732 | 9/1984 | Bennett et al. | 358/22 |
| 4,563,703 | 1/1986 | Taylor et al. | 358/22 X |
| 4,568,981 | 2/1986 | Beaulier | 358/183 |
| 4,602,286 | 7/1986 | Kellar et al. | 358/183 |
| 4,631,750 | 12/1986 | Gabriel et al. | 358/22 X |

Primary Examiner—Michael A. Masinick
Assistant Examiner—E. Anne Toth
Attorney, Agent, or Firm—John Smith-Hill

[57] ABSTRACT

An output video signal is derived from an input video signal by writing the input video signal into a frame buffer, generating a sequence of address words, modifying the sequence of address words, and using the modified sequence of address words to read the video signal from the frame buffer. The sequence of address words is modified by comparing each address word of the sequence with a reference word that defines a predetermined location of the scene represented by the input video signal, and combining each address word that defines a location of the input scene having a selected spatial relationship with the predetermined location with an offset word.

13 Claims, 12 Drawing Figures

METHOD AND APPARATUS FOR CARRYING OUT TELEVISION SPECIAL EFFECTS

This invention relates to a method and apparatus for carrying out television special effects.

BACKGROUND OF THE INVENTION

A television picture is a representation in substantially planar form of a scene that is composed by the producer of a television program. The scene may be composed of tangible objects, or it may be at least partially synthesized by artificial means, e.g. a television graphics system, so that the source of the video signal representing the scene is not a camera or a film scanner but a frame buffer and a computer used for adjusting the contents of the frame buffer. Generally, the scene is made up of two component scenes, namely a foreground scene and a background scene, that are combined using a travelling matte technique. For example, the foreground scene might contain an annulus against a solid color matte and the background scene a square against a screen of contrasting color, as shown in FIGS. 1(a) and 1(b) respectively, so that when the foreground and background scenes are combined the resulting picture has the appearance shown in FIG. 1(c).

A transform system operates on the video signal representing a scene, and may be used to carry out a spatial transformation on the scene. For example, the scene may be displaced to the right. If the foreground video signal representing the FIG. 1(a) scene is applied to a transform system which carries out a transformation on the signal such that the transformed signal represents the scene shown in FIG. 1(d), in which the annulus of the FIG. 1(a) scene has been shifted to the right, then the signal obtained by combining the transformed foreground signal with the background signal might represent the picture shown in FIG. 1(e). Most transform systems are of two main kinds, known as the forward transform system and the frame-based frame-based reverse transform system. FIG. 2 represents a reverse transform system based on principles that are known at present. It is believed that the FIG. 2 system does not exist in the prior art, and it is being described in order to provide information that will be useful in understanding the invention.

The transform system shown in FIG. 2 operates by digitizing the input video signal under control of a write clock 10 and writing the resulting sequence of digital words, each having, e.g. ten bits, into a video frame buffer 12 using addresses generated by a forward address generator 14. The input video signal is derived from an analog composite video signal in conventional interlaced format by separating it into its components (normally luminance and chrominance) and digitizing each component. The sampling rate for each of the chrominance components is only half that for the luminance component. The frame buffer 12 comprises a memory for storing the luminance component and a memory for storing the chrominance components. However, since the components are acted on in like manner in the transform system, it is not necessary to consider the components separately.

The operation of digitizing the video signal effectively resolves each raster line of the picture into multiple pixels, e.g. 720 pixels, that are small, but finite, in area. The location of a pixel in the scene can be defined by a two-coordinate display address (U, V) of the input screen (FIG. 1(a), e.g.). The address space of the video frame buffer is organized so that there is a one-to-one correspondence between the display addresses and the memory addresses generated by the forward address generator 14. Thus, the digital word representing the pixel having the display address (U, V) is written into the frame buffer 12 at a location that has a memory address that can be expressed as (U, V).

In order to read an output video signal from the frame buffer 12, a read address counter 16 operates under control of a read clock 17 to generate a sequence of addresses (X, Y) defining the locations in the output screen (FIG. 1(d)) of the pixels that will be successively addressed. The coordinate values X and Y each have the same number of significant digits as the coordinate values U and V respectively. Accordingly, the display addresses (X, Y) define the same possible pixel positions in the output display space as are defined in the input display space by the display addresses (U, V). However, the display addresses (X, Y) are not used directly to read the output video signal from the frame buffer. A reverse address generator 18 receives the output scene display addresses (X, Y) and multiplies them by a transform matrix T' to generate corresponding memory addresses (X', Y') which are used to read the video signal from the frame buffer. The transform matrix T' is applied to the reverse address generator 18 by a user interface 19, and defines the nature of the transform that is effected by the reverse transform system. If, for example, it is desired to effect a transformation in which the input scene is displaced diagonally upwards and to the left by an amount equal to the inter-pixel pitch in the diagonal direction, the transform matrix would be such that the memory address (X', Y') that is generated in response to the display address (X, Y) would be (X+1, Y+1), assuming that the origin of the coordinate system is in the upper left corner of the input and output scene, and values of X and Y increase to the right and downwards respectively.

In the general case, it is not sufficient for the values of X' and Y' to be related to X and Y by addition or subtraction of integers, and therefore the memory address coordinates X' and Y' have more significant digits than the display address coordinates X and Y. The reverse addresses are applied not only to the frame buffer 12 but also to a video interpolator 20. For each reverse address (X', Y'), the frame buffer outputs the respective digital words representing an array of pixels surrounding the position defined by the reverse address (X', Y'). For example, the data words representing the four pixels nearest the point defined by the address (X', Y') might be provided. These four data words are applied to the interpolator 20, and the interpolator combines these four digital words into a single digital output word based on the fractional portion of the address X', Y'). For example, using decimal notation, if the least significant digit of each coordinate X and Y is unity but the least significant digit of the coordinates X' and Y' is one-tenth, and the counter 16 generates the read address (23, 6) which is converted to a reverse address (56.3, 19.8) by being multiplied by the transform matrix T', the frame buffer 12 responds to the reverse address (56.3, 19.8) by providing the digital words stored at the addresses (56, 19), (56, 20), (57, 19) and (57, 20) and the interpolator 20 combines them into a single digital output word by weighting them 3:7 in the horizontal direction and 8:2 in the vertical direction. This digital word defines the value that is to be generated at the location of the output screen that is defined by the display address (23, 6).

The range of possible reverse addresses is greater than the range of memory addresses defining locations in the frame buffer 12, so that a validly-generated reverse address might define a location that does not exist in the frame buffer's address space. Therefore, the reverse addresses are also applied to an address limit detector 22 which responds to an invalid reverse address (an address which defines a location outside the address space of the frame buffer 12) by providing a signal which causes a video blanker 24 to inhibit the output signal of the frame buffer.

In parallel with the video channel comprising the video frame buffer 12, the video interpolator 20 and the video blanker 24 is a key channel comprising a key frame buffer 26, a key interpolator 28 and a key blanker 30. A key signal that is applied to the key channel provides opacity information about the foreground video signal applied to the video channel. This opacity information defines where and the extent to which a background scene represented by a background video signal can be seen in a composite picture (FIG. 1(c)) formed by mixing the foreground and background video signals under the influence of the key signal. Outside the boundaries of the foreground objects, the foreground scene is transparent (key=0) and the background scene is seen without modification by the foreground scene. If a foreground object is fully opaque (key=1), the background scene is fully obscured by the foreground object, but if a foreground object is only partially transparent (0<key<1) the background video signal is mixed with the foreground video signal in proportion to the value of the key. Because the foreground scene is transformed by the video channel, it is necessary to transform the key in the identical manner in order to maintain congruence between the foreground scene and the key. Therefore, the key signal is processed in the key channel in the same way as the foreground signal is processed in the video channel. Thus, the key signal undergoes the same spatial transformation and interpolation as the foreground signal, and is subject to the same address limit blanking.

The transform matrix T' must be the mathematical inverse of the desired spatial transform T, and it is for this reason that the reverse transform system is known as such.

A transform may also be carried out using a forward transform system, in which the address words that are used to write the video signal into the frame buffer, instead of those that are used to read the signal from the frame buffer, are operated on in accordance with the desired transform.

When a television picture is composed of a foreground scene and a background scene, special effects that are used to make the picture appear more realistic, e.g. so that it does not look as if it had been composed of two (or more) separate scenes, or to attract the attention of the viewer, are often applied with greater emphasis to the foreground scene than to the background scene. Special problems arise, however, when the foreground scene is transformed.

A source-space video effect is an effect that appears to have been applied to a picture before transformation takes place, so that a feature of the scene that arises from the source-space effect also undergoes transformation. In the FIG. 3(a) picture, the foreground scene comprises the letters L and R on a solid color panel and the background scene is a vertical surface of a contrasting solid color. The foreground scene may be split by dividing the panel along a vertical line and separating the two halves of the panel in the horizontal direction (FIG. 3(b)). Another effect that can be performed is to rotate the foreground scene, e.g. through 90 degrees, about an axis that is perpendicular to the viewing plane and extends through the center of the picture. If both the spatial transformation and the split are performed, the result that is obtained depends on whether the split effect was a source-space effect or a target-space effect. If the split were a source-space effect, the picture would appear as if the split had been performed before the rotation (FIG. 3(d)), whereas if the split were a target-space effect, the picture would appear as if the split had been performed after the rotation (FIG. 3(c)).

SUMMARY OF THE INVENTION

In a preferred embodiment of the present invention, an output video signal is derived from an input video signal representative of an input scene by writing the input video signal into a frame buffer, generating a sequence of address words, comparing each address word with a reference word that defines a predetermined location of the input scene, modifying at least those address words that define locations of the input scene having a selected spatial relationship with said predetermined location by combining each of them with an offset word, whereby a modified sequence of address words is generated, and using the modified sequence of address words to read the video signal from the frame buffer.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1A:
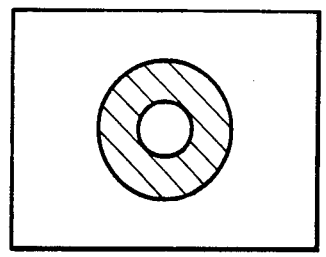
FIG. 1a-1e is a series of screens illustrating transformation of a foreground scene.
Figure 1B:
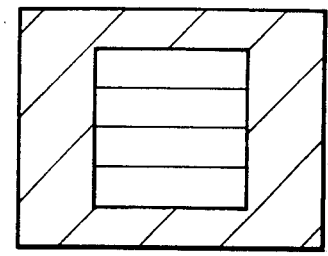
Figure 1C:
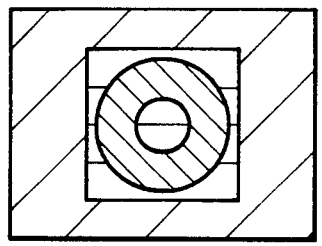
Figure 1D:
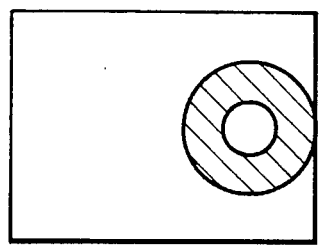
Figure 1E:
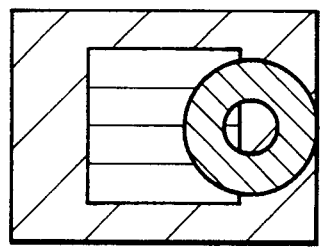
Figure 2:
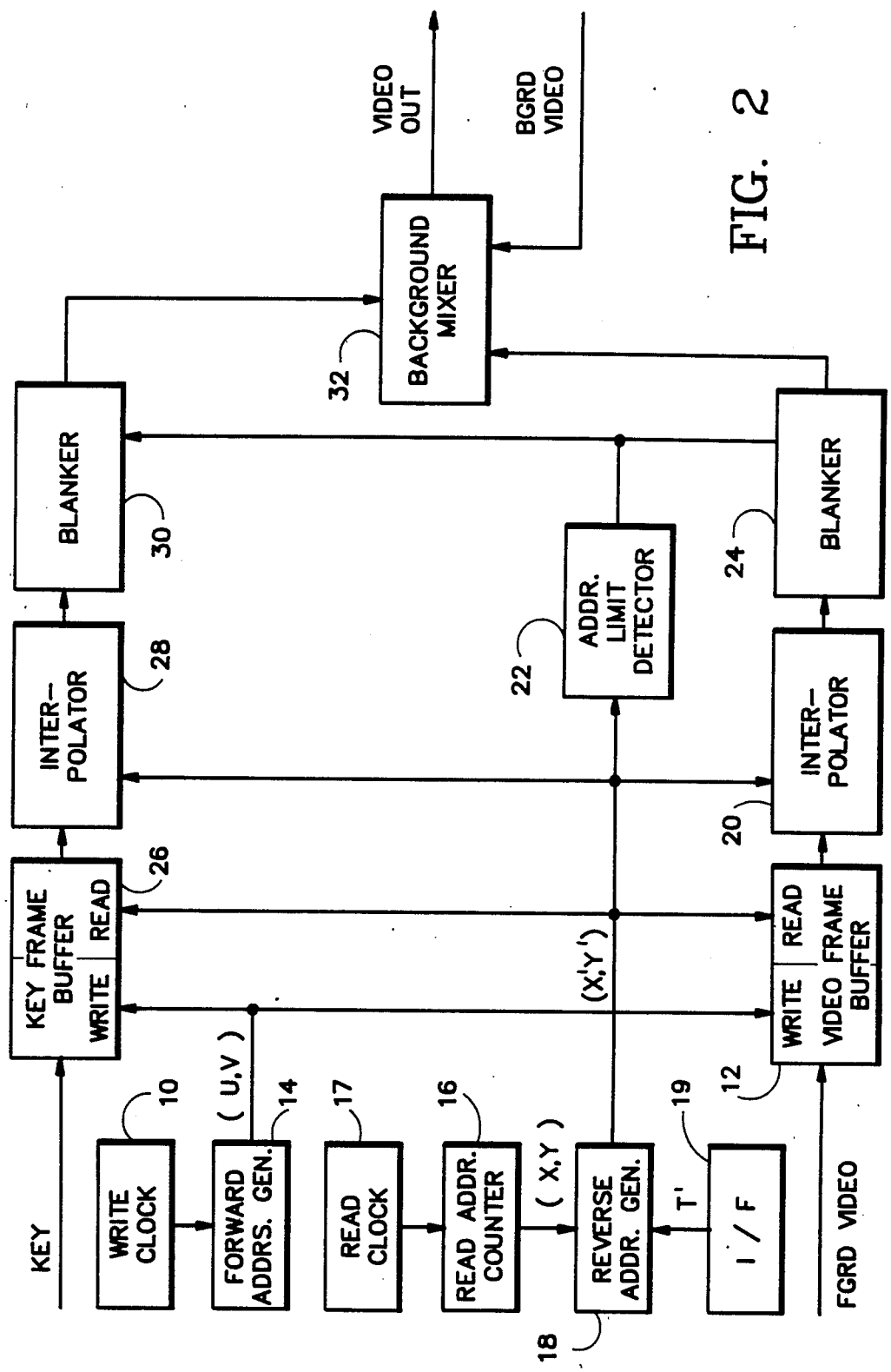
FIG. 2 is a block diagram of a reverse transform system.
Figure 3A:
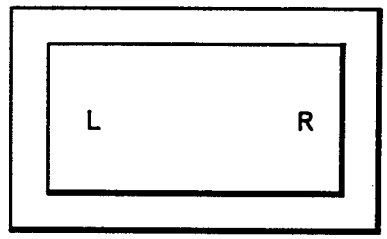
FIG. 3 is a series of screens illustrating the distinction between a source-space effect and a target-space effect.
Figure 3B:
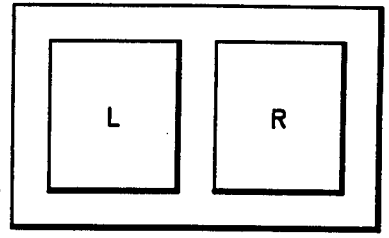
Figure 3C:
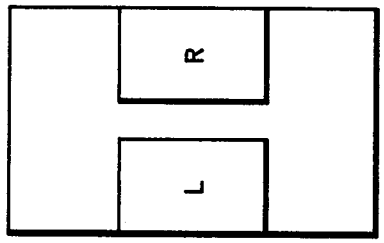
Figure 3D:
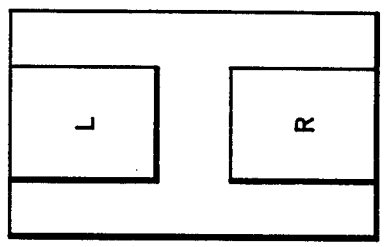
Figure 4:
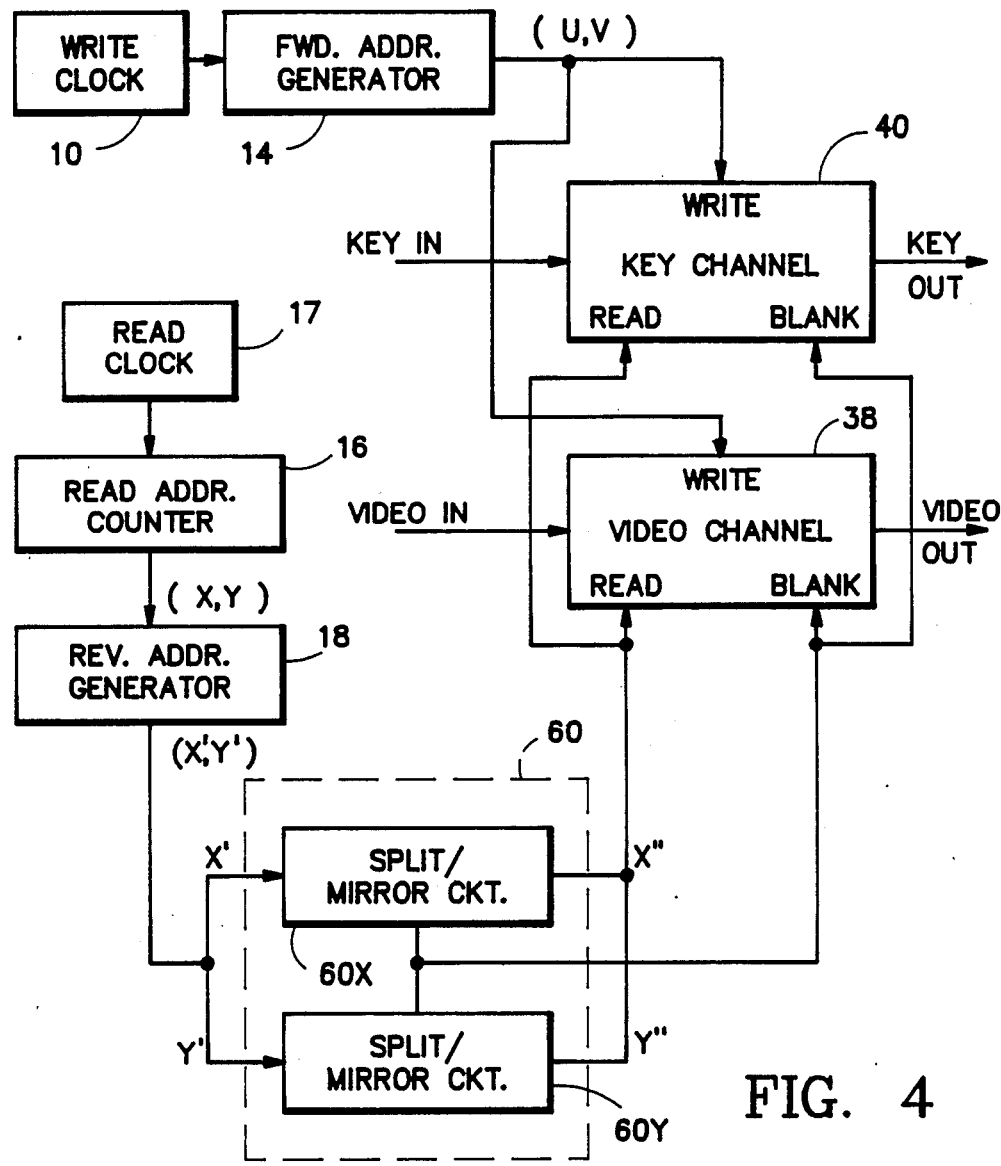
FIG. 4 is a block diagram of a special effects system embodying the present invention.

In the reverse transform system illustrated in FIG. 4, the video channel and the key channel are illustrated as single blocks 38 and 40, and the address limit detector is not shown. The FIG. 4 reverse transform system differs from that of FIG. 2 by incorporating a split/mirror logic block 60 that is connected to the output of the reverse address generator. Through use of the split/mirror logic block, the scene represented by the input video signal can be divided along a horizontal axis and/or a vertical axis (in the source space) and/or a mirror image of the part of the input scene on one side of the horizontal axis and/or the vertical axis (in the source space) can be created on the opposite side of the horizontal axis and/or the vertical axis.

Figure 5:
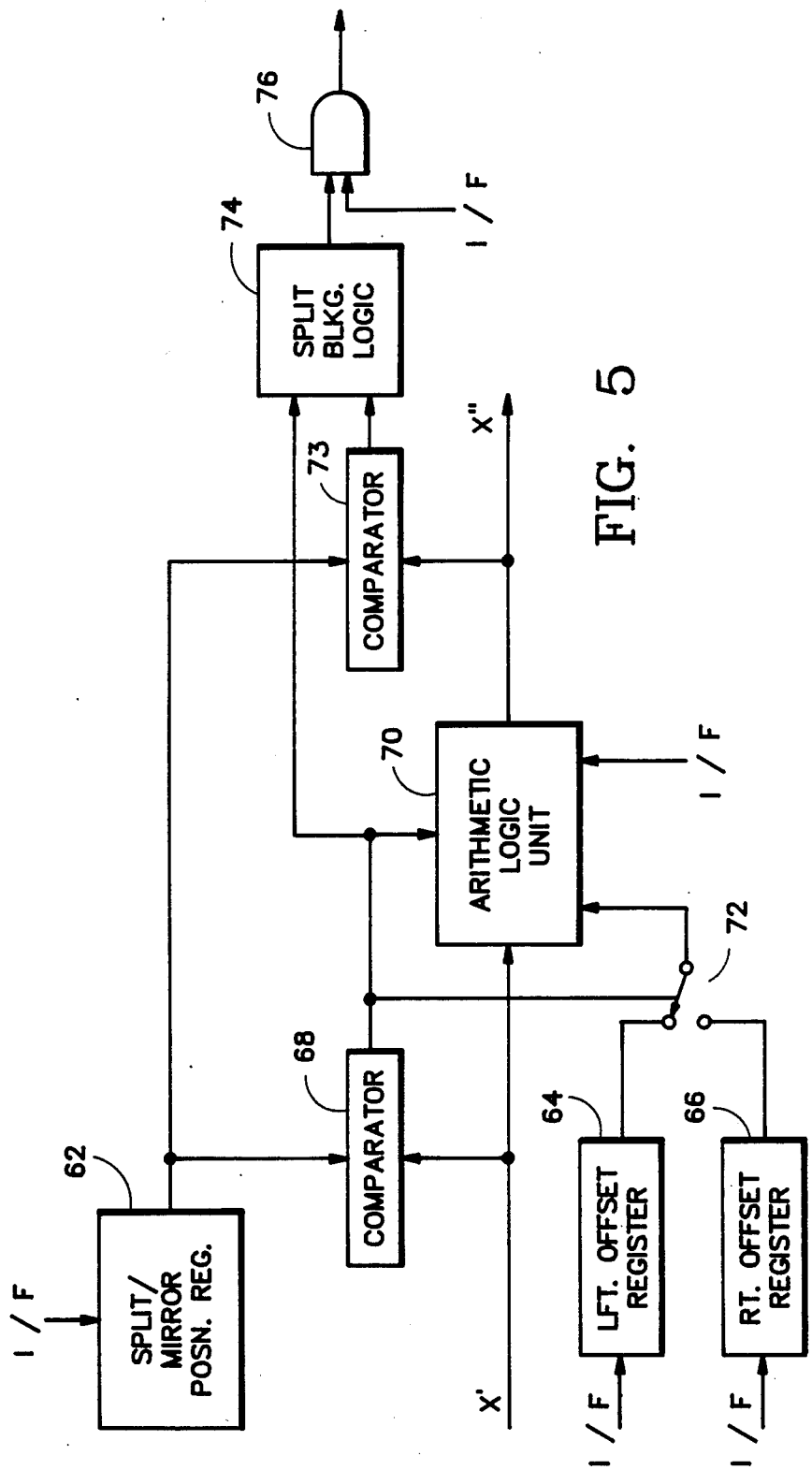
FIG. 5 is a block diagram of a component of the FIG. 4 system.

The split/mirror logic block 60 receives the sequence of reverse addresses (X', Y') and modifies the X' and Y' portions of the addresses. Identical circuits 60X and 60Y act independently on the X' and Y' portions of the reverse addresses. The circuit that acts on the X' portion of the reverse addresses is shown in FIG. 5. For the sake of definiteness with respect to terms of orientation and position, it will be assumed in the following description of the operation of the FIG. 5 circuit that the reverse transform system is set up so that a spatial transformation is not performed by the reverse address generator.

The FIG. 5 circuit comprises a split/mirror position register 62 in which a reference position word is stored and left and right offset registers 64 and 66 in which offset words are stored. The reference position word defines the position in the input scene of the vertical axis with reference to which the mirror or split effect is to take place. A comparator 68 compares the input address word X' with the content of the register 62 and controls a switch 72 in dependence on the result of the comparison for selecting which of the registers 64 and 66 is connected to the ALU 70. Assuming that a value of zero for the X' portion of the address represents the left edge of the scene and the value of X' increases in the positive sense towards the right, when the value of X' is smaller than that of the word stored in the register 62 it represents a position that is to the left of the split/mirror axis, and the comparator 68 causes the switch 72 to select the register 64, whereas when the value of X' is larger than that of the word stored in the register 62 it represents a position that is to the right of the split/mirror axis, and the register 66 is selected. The output of the comparator 68 is also applied to an arithmetic logic unit (ALU) 70.

For each input address word X' that it receives, the ALU computes a corresponding output address word X''. The ALU 70 is able to perform two arithmetic operations, namely add the value of X' to the value of the word stored in the offset register selected by the switch 72, or subtract the value of X' from the value of the word stored in the selected offset register. The nature of the arithmetic operation depends on commands received by the ALU from the operator interface. The operator interface also enables the operator to determine the words stored in the registers 62, 64 and 66. By appropriate selection of the arithmetic operations and the values of the words stored in the registers, the operator is able to cause the split/mirror logic circuit shown in FIG. 5 to implement each of the following effects:

(1) allow the input scene to pass unchanged,
(2) split but no mirror,
(3) mirror but no split, and
(4) both split and mirror.

Each effect can be applied selectively just to the left side of the input scene, just to the right side of the input scene, or to both the left side and the right side of the input scene. Thus, sixteen possible combinations of effects can be implemented using the FIG. 5 circuit.

If, for example, the operator causes the value zero to be stored in the register 64 and commands the ALU 70 to carry out the addition operation for the left side of the output scene, the ALU responds to the output of the comparator 68 indicating that the input word X' represents the left side of the input scene by adding zero to the input word and providing an output word X'' that is the same as the input word. Thus, the input word is passed unchanged, and the left side of the output scene is the same as the left side of the input scene. If, on the other hand, a value 100 had been stored in the register 64, the output word would have been 100 greater than the input word. Consequently, when the output word is used to read the video signal from the frame buffer, the left side of the input scene appears in the output scene displaced by 100 pixels to the left.

If the operator causes the value 360 to be stored in the register 62 (corresponding to the center of the screen in the horizontal direction) and the value 720 to be stored in the register 64, and commands the ALU 70 to carry out the subtraction operation for the left side of the output scene, the ALU responds to the output of the comparator indicating that the address word X' represents the left side of the screen by subtracting the address word from the offset word and providing an output address word X'' that is greater than the input address word and decreases as the value of the input address word increases. Accordingly, the distribution of the values of X'' over the left side of the output address space (X, Y) is a mirror image of that for the right side of the input address space (U, V), and the left side of the output scene is a reflection of the right side of the input scene. If, on the other hand, the value 920 had been stored in the register 64, the output word would have been 200 greater than in the previous case, and therefore the left side of the output scene would have been a reflection of the portion of the input scene that is to the right of the split/mirror axis by 200 pixels.

In general, therefore, the input scene passes unchanged if the ALU operation is addition and the offset value is zero, and there is a horizontal split if the ALU operation is addition and the offset value is non-zero, whereas there is a simple reflection if the ALU operation is subtraction and the offset value is twice the value of the split/mirror position word and there is reflection plus horizontal split if the ALU operation is subtraction and the offset value is different from twice the value of the split/mirror position word.

The output address word X'' is applied to one input of a comparator 73 which receives as its other input the content of the register 62. The output of the comparator 73 is applied to a split blanking logic circuit 74. The split blanking logic circuit also receives the output of the comparator 68. If one of X' and X'' is smaller than the value stored in the register 62 and the other of X' and X'' is greater than the value stored in the register 62 (which can only happen if there is a horizontal split, with or without the mirror effect), this indicates that the output address word X'' represents a location that is between the two sides of the split, and a split blanking signal is asserted. If X' and X'' are either both smaller than the value stored in the register 62 or both larger than the value stored in the register 62, the split blanking signal is not asserted. The split blanking output of the split blanking logic circuit 74 is connected to an AND gate 76, which receives an on/off signal from the operator interface, indicating whether or not split blanking is to be invoked. If split blanking is to be invoked and the split blanking signal is asserted, the split blanking signal is applied by the AND gate to the blankers of the video and key channels and the output signals of the interpolators are blanked, whereas if split blanking is not to be invoked, the split blanking signal is inhibited by the AND gate 76 and the output signals of the interpolators are not blanked.

The operation of the split/mirror logic circuit 60Y is analogous to that of the circuit 60X. The circuit 60Y receives input address words Y' and generates output address words Y'' that are such that vertical split and/or mirror effects can be provided.

As noted previously, the foregoing description has been presented on the assumption that no spatial transformation has been effected by use of the reverse address generator. If, however, a spatial transformation had been effected by use of the reverse address generator, the split and/or mirror effects appear as source space effects rather than target space effects because they do not affect the manner in which the video and key signals are written into the frame buffers.

It will be appreciated that the present invention is not restricted to the particular embodiment that has been described and illustrated, and that variations may be made therein without departing from the scope of the invention as defined in the appended claims and equivalents thereof. For example, it is not essential to the invention to provide the capability of performing both a split effect and a mirror effect. The invention may be implemented in a field-based effects device as well as in a frame-based effects device.

I claim:

1. A method of deriving an output video signal from an input video signal that is representative of an input scene, comprising writing the input video signal into a frame buffer, generating a sequence of address words, comparing each address word with a reference word that defines a predetermined location of the input scene, modifying at least those address words that define locations of the input scene having a selected spatial relationship with said predetermined location by combining each of them with an offset word, whereby a modified sequence of address words is generated, and using the modified sequence of address words to read the video signal from the frame buffer.

2. A method according to claim 1, wherein the address words that define locations of the input scene having said selected spatial relationship with said predetermined location are modified by adding each of them to the offset word.

3. A method according to claim 1, wherein the address words that define locations of the input scene having said selected spatial relationship with said predetermined location are modified by subtracting each of them from the offset word.

4. A method according to claim 1, wherein address words that define locations of the input scene having a second selected spatial relationship with said predetermined location, the second selected spatial relationship and the first-mentioned selected spatial relationship being mutually exclusive, are modified by combining each of them with a second offset word.

5. A method according to claim 4, wherein the address words that define locations of the input scene having the first-mentioned selected spatial relationship with said predetermined location are modified by adding each of them to the first-mentioned offset word, and the address words that define locations of the input scene having the second selected spatial relationship with said predetermined location are modified by subtracting each of them from the second offset word.

6. A method of deriving an output video signal from an input video signal representative of an input scene, comprising writing the input video signal into a frame buffer using a first sequence of address words, generating a second sequence of address words that is identical to the first sequence of address words but is in delayed relationship with respect to the first sequence of address words, operating on address words of the second sequence so as to generate a third sequence of address words, the third sequence of address words defining locations that are within the memory space of the frame buffer but are distributed over said memory space in a different manner from the address words of the first sequence, comparing each address word of the third sequence with a reference word that defines a predetermined location in the memory space of the frame buffer, modifying at least those address words of the third sequence that define locations of the memory space that have a selected relationship with said predetermined location by combining each of them with an offset word, whereby a fourth sequence of address words is generated, and using the fourth sequence of address words to read the video signal from the frame buffer.

7. A method according to claim 6, wherein the address words of the third sequence that define locations of the input scene having said selected spatial relationship with said predetermined location are modified by adding each of them to the offset word.

8. A method according to claim 5, wherein the address words of the third sequence that define locations of the input scene having said selected spatial relationship with said predetermined location are modified by subtracting each of them from the offset word.

9. A method according to claim 6, wherein address words of the third sequence that define locations of the input scene having a second selected spatial relationship with said predetermined location, the second selected spatial relationship and the first-mentioned selected spatial relationship being mutually exclusive, are modified by combining each of them with a second offset word.

10. A method according to claim 9, wherein the address words of the third sequence that define locations of the input scene having the first-mentioned selected spatial relationship with said predetermined location are modified by adding each of them to the first-mentioned offset word and the address words of the third sequence that define locations to the input scene having the second selected spatial relationship with said predetermined location are modified by subtracting each of them from the second offset word.

11. Apparatus for deriving an output video signal from an input video signal representative of an input scene, comprising a frame buffer, means for writing the input video signal into the frame buffer, means for generating a sequence of address words, comparison means for comparing each address word with a reference word that defines a predetermined location of the input scene, means for modifying at least those address words that define locations of the input scene having a selected spatial relationship with said predetermined location by combining each of them with an offset word, whereby a modified sequence of address words is generated, and means for using the modified sequence of address words to read the video signal from the frame buffer.

12. Apparatus according to claim 11, wherein the means for modifying the address words that define locations of the input scene having said selected spatial relationship with said predetermined location comprise a register containing the offset word, a switch controlled by the comparison means for selecting the register in the event that the location defined by the address word has said selected spatial relationship with said predetermined location, and an arithmetic unit connected to the switch for receiving the offset word contained in the register and combining it with the address word.

13. Apparatus according to claim 12, comprising a second register containing a second offset word, and wherein the comparison means causes the switch to select the second register when the address word defines a location of the input scene having a second selected spatial relationship with said predetermined location, said second selected spatial relationship and the first-mentioned selected spatial relationship being mutually exclusive, so that the arithmetic unit receives the second offset word when the address word defines a location having said second selected spatial relationship with said predetermined location and combines the address word with the second offset word.

* * * * *